(12) United States Patent
Hodgdon et al.

(10) Patent No.: US 10,703,549 B2
(45) Date of Patent: Jul. 7, 2020

(54) WATER SOLUBLE CONTAINERS AND METHODS OF MAKING THEM

(71) Applicants: The Procter & Gamble Company, Cincinnati, OH (US); Virginia Tech Intellectual Properties Inc, Blacksburg, VA (US)

(72) Inventors: Travis Kyle Hodgdon, Cincinnati, OH (US); Douglas Michael Graham, Cincinnati, OH (US); Michael Sean Farrell, Terrace Park, OH (US); Corey James Kenneally, Mason, OH (US); Christopher B Williams, Blacksburg, VA (US); Callie Zawaski, Blacksburg, VA (US)

(73) Assignee: The Procter and Gamble Company, Cincinatti, OH (US)

( * ) Notice: Subject to any disclaimer, the term of this patent is extended or adjusted under 35 U.S.C. 154(b) by 10 days.

(21) Appl. No.: 16/015,228

(22) Filed: Jun. 22, 2018

(65) Prior Publication Data
US 2019/0002172 A1  Jan. 3, 2019

Related U.S. Application Data

(60) Provisional application No. 62/527,257, filed on Jun. 30, 2017.

(51) Int. Cl.
*B65D 65/46* (2006.01)
*C11D 17/04* (2006.01)
(Continued)

(52) U.S. Cl.
CPC .............. *B65D 65/46* (2013.01); *B33Y 10/00* (2014.12); *B33Y 80/00* (2014.12); *C11D 17/042* (2013.01);
(Continued)

(58) Field of Classification Search
CPC ........ B33Y 10/00; B33Y 80/00; B65D 65/46; C11D 17/04; C11D 17/042; C11D 17/043; C11D 17/044; C11D 17/045
(Continued)

(56) References Cited

U.S. PATENT DOCUMENTS 6,070,107 A    5/2000  Lombardi et al.
6,228,923 B1 *  5/2001  Lombardi ............... C08L 53/00
                                                          524/425
(Continued)

FOREIGN PATENT DOCUMENTS

WO    WO2015054100 A2    4/2015
WO    WO-2015054100 A3 *  7/2015
(Continued)

OTHER PUBLICATIONS

Hoque et al, "Fabrication and characterization of hybrid PCL/PEG 3D scaffolds for potential tissue engineering application", Materials Letters, vol. 131, 2014, pp. 255-258, XP028875877, ISSN: 0167-577X.
(Continued)

*Primary Examiner* — Bryon P Gehman
(74) *Attorney, Agent, or Firm* — Alexander S. Anoff

(57) ABSTRACT

A water soluble container comprises a water soluble shell enclosing a volume. The water soluble shell comprises a set of voxels.

20 Claims, 1 Drawing Sheet

(51) Int. Cl.
  *B33Y 10/00* (2015.01)
  *B33Y 80/00* (2015.01)
(52) U.S. Cl.
  CPC .......... *C11D 17/043* (2013.01); *C11D 17/044* (2013.01); *C11D 17/045* (2013.01)
(58) Field of Classification Search
  USPC ...................................................... 206/524.8
  See application file for complete search history.

(56) References Cited

U.S. PATENT DOCUMENTS

| | | | |
|---|---|---|---|
| 6,790,403 B1* | 9/2004 | Priedeman, Jr. | ........ B29C 41/36 264/442 |
| 8,404,171 B2 | 3/2013 | Heenan | |
| 8,522,663 B2* | 9/2013 | Dreyer | ...................... F41H 5/24 89/36.02 |
| 8,579,620 B2* | 11/2013 | Wu | ......................... G06T 17/00 425/7 |
| 8,875,875 B2* | 11/2014 | Fux | ....................... B65D 31/02 206/223 |
| 9,138,981 B1 | 9/2015 | Hirsch et al. | |
| 9,314,429 B2* | 4/2016 | Jacob | ................... A61K 9/2095 |
| 9,492,380 B2* | 11/2016 | Jacob | ................... A61K 31/357 |
| 9,616,018 B2* | 4/2017 | Jacob | ................... A61K 9/2054 |
| 9,816,058 B2* | 11/2017 | Rives | ..................... B33Y 80/00 |
| 9,840,347 B1* | 12/2017 | Linnell | ............... B65D 81/051 |
| 10,363,220 B2* | 7/2019 | Li | ......................... A61K 9/2031 |
| 10,410,403 B1* | 9/2019 | X et al. | .................... G06T 17/05 |
| 10,543,639 B2* | 1/2020 | Hodgdon | ............... B33Y 10/00 |
| 2001/0025073 A1 | 9/2001 | Lombardi et al. | |
| 2012/0224755 A1 | 9/2012 | Wu | |

FOREIGN PATENT DOCUMENTS

| | | |
|---|---|---|
| WO | WO2016125860 A1 | 8/2016 |
| WO | WO2018046569 A1 | 3/2018 |

OTHER PUBLICATIONS

Hoque et al, "Processing of Polycaprolactone-Based Copolymers into 3D Scaffolds, and Their Cellular Responses", Tissue Engineering Part A, vol. 15, No. 10, Oct. 1, 2009, pp. 3013-3024, XP055412724, ISSN: 1937-3341.
International Search Report and Written Opinion dated Sep. 5, 2018, U.S. Appl. No. 16/015,228, 10 pgs.

\* cited by examiner

1000

1000

WATER SOLUBLE CONTAINERS AND METHODS OF MAKING THEM

FIELD OF THE INVENTION

The invention relates to water soluble containers. The invention relates particularly to water soluble containers containing an active or benefit agent.

BACKGROUND OF THE INVENTION

The use of active agents in solution to achieve desired outcomes is well known. Cleaning, disinfecting, conditioning and other agents are solubilized to provide better efficacy by distributing the agents throughout the solution enabling contact and action upon any target items placed in the solution. Achieving the proper dosing of respective active agents, in addition to achieving the desired release of the agents into solution in terms of both timing and agent sequence is challenging. What is needed is a mechanism to enable proper dosing and release of active agents in liquid environments for the purpose of having the agent act upon target objects in contact with the environment.

SUMMARY OF THE INVENTION

In one aspect, a water soluble container comprises a water soluble shell enclosing a volume, the shell comprising a set of voxels.

DETAILED DESCRIPTION OF THE INVENTION

Figure 1:
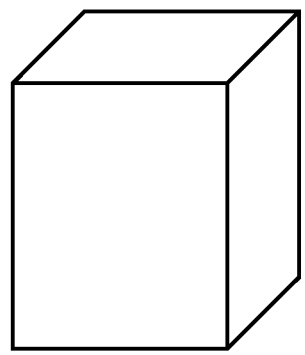
FIG. 1 provides a schematic illustration of one embodiment of the invention.

Unless otherwise noted, all composition percentages are provides as % by weight

In one embodiment, a water soluble container comprises a water soluble shell enclosing a volume, the shell comprising a set of voxels. The enclosed volume may be at least partially filled with an active element. The active element may comprise a solid, liquid, gaseous or multiphase composition.

In one embodiment, the active element may be selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; hard surface care agents, and/or conditioning agents such as liquid and/or powder dishwashing agents (for hand dishwashing and/or automatic dishwashing machine applications), and polishing agents; other cleaning and/or conditioning agents such as antimicrobial agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; water-treatment agents such as water clarifying and/or water disinfecting agents, and combinations thereof.

One or more classes of chemicals may be useful for one or more of the active agents listed above. For example, surfactants may be used for any number of the active agents described above. Likewise, bleaching agents may be used for fabric care, hard surface cleaning, dishwashing and even teeth whitening. Therefore, one of ordinary skill in the art will appreciate that the active agents will be selected based upon the desired intended use of the particle.

In an embodiment, suitable surfactants may include anionic, nonionic, zwitterionic/amphoteric surfactants, and combinations thereof.

Suitable anionic surfactants useful herein may include, but are not limiting to, a sulfate detersive surfactant, e.g., alkoxylated or non-alkoxylated alkyl sulfates; a sulfonic detersive surfactant, e.g., alkyl benzene sulfonates, paraffin sulfonates or secondary alkane sulfonates; and combinations thereof.

Suitable nonionic surfactants useful herein may include, but are not limiting to, linear or branched alkoxylated fatty alcohols, and combinations thereof.

Suitable cationic surfactants useful herein may include, but are not limiting to, quaternary ammonium surfactants, cationic ester surfactants, alkyl pyridinium compounds, alkyl quaternary ammonium compounds, alkyl quaternary phosphonium compounds, alkyl ternary sulphonium compounds, and combinations thereof.

Suitable zwitterionic/amphoteric surfactants useful herein may include, but are not limiting to, derivatives of secondary and tertiary amines, derivatives of heterocyclic secondary and tertiary amines, or derivatives of quaternary ammonium, quaternary phosphonium or tertiary sulfonium compounds. Examples of zwitterionic/amphoteric surfactants may be amine oxide or betaine surfactant.

Suitable fluorescent brighteners include: di-styryl biphenyl compounds, e.g. Tinopal® CBS-X, di-amino stilbene di-sulfonic acid compounds, e.g. Tinopal® DMS pure Xtra and Blankophor® HRH, and Pyrazoline compounds, e.g. Blankophor® SN, and coumarin compounds, e.g. Tinopal® SWN. Preferred brighteners are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)]; amino}stilbene-2-2' disulfonate, disodium 4,4'-bis{[(4-anilino-6-morpholino-1,3,5-triazin-2-yl)] amino}stilbene-2-2' disulfonate, and disodium 4,4'-bis(2-sulfostyryl)biphenyl. A suitable fluorescent brightener is C.I. Fluorescent Brightener 260, which may be used in its beta or alpha crystalline forms, or a mixture of these forms.

Preferred chelants are selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid) and hydroxyethane di(methylene phosphonic acid). A preferred chelant is ethylene diamine-N'N'-disuccinic acid and/or hydroxyethane diphosphonic acid.

Suitable hueing agents include small molecule dyes, typically falling into the Colour Index (C.I.) classifications of Acid, Direct, Basic, Reactive or hydrolyzed Reactive, Solvent or Disperse dyes for example that are classified as Blue, Violet, Red, Green or Black, and provide the desired shade either alone or in combination. Preferred hueing agents include Acid Violet 50, Direct Violet 9, 66 and 99, Solvent Violet 13 and any combination thereof. Suitable hueing agents include phthalocyanine and azo dye conjugates, such as described in WO2009/069077.

The active agent may comprise a single described agent or a combination of described agents.

The container shell comprises a set of voxels or voxel elements. The set of voxels may be sequentially fabricated using fused deposition material (FDM) techniques. This involves melting the material of interest, depositing it as a set of voxels and allowing the voxels to cool and harden. The set of voxels may be provided as digital information file. Exemplary file formats include: .STL, .OBJ, G-code, SVG files, .dxf files, and other file formats as described in ASTM F2792. The container is preferably sealed such that the active agent is fully enclosed. In one embodiment, the container is comprised exclusively of a series of voxels. In another embodiment, the container is comprised of a series of voxels and a sealing component. Examples of suitable sealing components include films, caps and welded polymer. In another embodiment, the majority of the container is made by traditional manufacturing methods including but not limited to injection and blow molding and sealed with a series of voxels. In one embodiment, the temperature of the active element is similar to the printing temperature of the voxel material. In yet another embodiment, the active element temperature is between 5 and 50 C below the printing temperature of the voxel material.

The thickness of the shell may be uniform or may vary as desired. Varying the thickness may enable variations in the dissolution time for particular portions of the shell and an accompanying variation in the exposure of the respective active elements to the environment surrounding the container. The water soluble shell may comprise one of more benefit agents within the shell itself. Such benefit agents may be released into the environment as the shell is solubilized.

The container may be post processed to improve the look, feel and/or function of the container. Examples of suitable post-processing steps include sanding, painting, chemical vapor smoothing, printing and shrink warping.

The shape of the container may be used to convey an intended purpose or use of the container and active elements contained within. In one example, the active element is a laundry detergent composition designed for bleaching whites and the container is shaped like a white dress shirt. In another example, the composition is tailored to a specific users needs and the container is shaped into that individuals name.

Exemplary benefit agents include: perfumes, pro-perfumes, finishing aids, malodor control and removal agents, odor neutralizers, polymeric dye transfer inhibiting agents, cationic deposition enhancing polymers, builders, heavy metal ion sequestrants, surfactants, suds stabilizing polymers, pH modifiers, buffering agents, alkalinity sources, fabric softeners, antistatic agents, dye fixatives, dye abrasion inhibitors, wrinkle reduction agents, wrinkle resistance agents, wrinkle release agents, silicones (e.g., silicone oils, cationic silicones, silicone gums, high refractive silicones, and silicone resins), soil release polymers, soil capture polymers, flocculating polymers, soil repellency agents, colorants, pigments, opacifiers, adversive agents such as bittering agents, anti-redeposition agents, bleach activators, bleach catalysts, bleach boosters, bleaches, photobleaches, enzymes, coenzymes, enzyme stabilizers, crystal growth inhibitors, anti-tarnishing agents, anti-oxidants, metal ion salts, corrosion inhibitors, antiperspirant, zinc pyrithione, plant derivatives, plant extracts, plant tissue extracts, plant seed extracts, plant oils, botanicals, botanical extracts, essential oils, skin sensates, astringents, etc. (e.g., clove oil, menthol, camphor, *eucalyptus* oil, eugenol, menthyl lactate, witch hazel distillate), anti-acne agents (salicylic acid), anti-dandruff agents, antifoaming agents, cosmetic astringents, cosmetic biocides, denaturants, drug astringents, external analgesics, film formers or materials, e.g., polymers, for aiding the film-forming properties and substantivity of the composition (e.g., copolymer of eicosene and vinyl pyrrolidone), skin bleaching and lightening agents, (e.g., hydroquinone, kojic acid, ascorbic acid, magnesium ascorbyl phosphate, ascorbyl glucoside, pyridoxine), skin-conditioning agents (e.g., humectants and occlusive agents), skin soothing and/or healing agents and derivatives (e.g., panthenol, and derivatives such as ethyl panthenol, aloe vera, pantothenic acid and its derivatives, allantoin, bisabolol, and dipotassium glycyrrhizinate), skin treating agents (e.g., vitamin D compounds, mono-, di-, and tri-terpenoids, beta-ionol, cedrol), sunscreen agents, insect repellants, oral care actives, personal health care actives, vitamins, anti-bacterial agents, anti-microbial agents, antifungal agents, their derivatives, and mixtures thereof.

In one embodiment, the benefit agent is at least partially surrounded with a wall material to create a microcapsule. In one aspect, the microcapsule wall material may comprise: melamine, polyacrylamide, silicones, silica, polystyrene, polyurea, polyurethanes, polyacrylate based materials, gelatin, styrene malic anhydride, polyamides, and mixtures thereof. In one aspect, said melamine wall material may comprise melamine crosslinked with formaldehyde, melamine-dimethoxyethanol crosslinked with formaldehyde, and mixtures thereof. In one aspect, said polystyrene wall material may comprise polyestyrene cross-linked with divinylbenzene. In one aspect, said polyurea wall material may comprise urea crosslinked with formaldehyde, urea crosslinked with gluteraldehyde, and mixtures thereof. In one aspect, said polyacrylate based materials may comprise polyacrylate formed from methylmethacrylate/dimethylaminomethyl methacrylate, polyacrylate formed from amine acrylate and/or methacrylate and strong acid, polyacrylate formed from carboxylic acid acrylate and/or methacrylate monomer and strong base, polyacrylate formed from an amine acrylate and/or methacrylate monomer and a carboxylic acid acrylate and/or carboxylic acid methacrylate monomer, and mixtures thereof. In one aspect, the perfume microcapsule may be coated with a deposition aid, a cationic polymer, a non-ionic polymer, an anionic polymer, or mixtures thereof. Suitable polymers may be selected from the group consisting of: polyvinylformaldehyde, partially hydroxylated polyvinylformaldehyde, polyvinylamine, polyethyleneimine, ethoxylated polyethyleneimine, polyvinylalcohol, polyacrylates, and combinations thereof. In one aspect, one or more types of microcapsules, for example two microcapsules types having different benefit agents may be used.

In one embodiment, the benefit agent is a perfume oil and may include materials selected from the group consisting of 3-(4-t-butylphenyl)-2-methyl propanal, 3-(4-t-butylphenyl)-propanal, 3-(4-isopropylphenyl)-2-methylpropanal, 3-(3,4-methylenedioxyphenyl)-2-methylpropanal, and 2,6-dimethyl-5-heptenal, alpha-damascone, beta-damascone, deltadamascone, beta-damascenone, 6,7-dihydro-1,1,2,3,3-pentamethyl-4(5H)-indanone, methyl-7,3-dihydro-2H-1,5-benzodioxepine-3-one, 2-[2-(4-methyl-3-cyclohexenyl-1-yl)propyl]cyclopentan-2-one, 2-sec-butylcyclohexanone, and beta-dihydro ionone, linalool, ethyllinalool, tetrahydrolinalool, and dihydromyrcenol. Suitable perfume materials can be obtained from Givaudan Corp. of Mount Olive, N.J., USA, International Flavors & Fragrances Corp. of South Brunswick, N.J., USA, or Quest Corp. of Naarden, Netherlands. In one aspect, the benefit agent is a perfume microcapsule.

In one embodiment, the benefit agent is encapsulated in a shell. In one embodiment, the encapsulated benefit agent is perfume oil and the shell is a polymer.

In one embodiment, the benefit agent is a silicone. Useful silicones can be any silicone comprising compound. In one embodiment, the silicone polymer is selected from the group consisting of cyclic silicones, polydimethylsiloxanes, aminosilicones, cationic silicones, silicone polyethers, silicone resins, silicone urethanes, and mixtures thereof. In one embodiment, the silicone is a polydialkylsilicone, alternatively a polydimethyl silicone (polydimethyl siloxane or "PDMS"), or a derivative thereof. In another embodiment, the silicone is chosen from an aminofunctional silicone, amino-polyether silicone, alkyloxylated silicone, cationic silicone, ethoxylated silicone, propoxylated silicone, ethoxylated/propoxylated silicone, quaternary silicone, or combinations thereof.

In one embodiment the benefit agent is an enzyme. Suitable enzymes include proteases, amylases, cellulases, lipases, xylogucanases, pectate lyases, mannanases, bleaching enzymes, cutinases, and mixtures thereof.

For the enzymes, accession numbers or IDs shown in parentheses refer to the entry numbers in the databases Genbank, EMBL and Swiss-Prot. For any mutations standard 1-letter amino acid codes are used with a * representing a deletion. Accession numbers prefixed with DSM refer to microorgansims deposited at Deutsche Sammlung von Mikroorganismen und Zellkulturen GmbH, Mascheroder Weg 1b, 38124 Brunswick (DSMZ).

Protease.

The composition may comprise a protease. Suitable proteases include metalloproteases and/or serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from Bacillus, such as Bacillus lentus, Bacillus alkalophilus (P27963, ELYA_BACAO), Bacillus subtilis, Bacillus amyloliquefaciens (P00782, SUBT_BACAM), Bacillus pumilus (P07518) and Bacillus gibsonii (DSM14391).

(b) trypsin-type or chymotrypsin-type proteases, such as trypsin (e.g. of porcine or bovine origin), including the Fusarium protease and the chymotrypsin proteases derived from Cellumonas (A2RQE2).

(c) metalloproteases, including those derived from Bacillus amyloliquefaciens (P06832, NPRE_BACAM).

Preferred proteases include those derived from Bacillus gibsonii or Bacillus Lentus such as subtilisin 309 (P29600) and/or DSM 5483 (P29599).

Suitable commercially available protease enzymes include: those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Genencor International; those sold under the tradename Opticlean® and Optimase® by Solvay Enzymes; those available from Henkel/Kemira, namely BLAP (P29599 having the following mutations S99D+S101R+S103A+V104I+G159S), and variants thereof including BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D) all from Henkel/Kemira; and KAP (Bacillus alkalophilus subtilisin with mutations A230V+S256G+S259N) from Kao.

Amylase:

Suitable amylases are alpha-amylases, including those of bacterial or fungal origin. Chemically or genetically modified mutants (variants) are included. A preferred alkaline alpha-amylase is derived from a strain of Bacillus, such as Bacillus licheniformis, Bacillus amyloliquefaciens, Bacillus stearothermophilus, Bacillus subtilis, or other Bacillus sp., such as Bacillus sp. NCIB 12289, NCIB 12512, NCIB 12513, sp 707, DSM 9375, DSM 12368, DSMZ no. 12649, KSM AP1378, KSM K36 or KSM K38. Preferred amylases include:

(a) alpha-amylase derived from Bacillus licheniformis (P06278, AMY_BACLI), and variants thereof, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

(b) AA560 amylase (CBU30457, HD066534) and variants thereof, especially the variants with one or more substitutions in the following positions: 26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, preferably that also contain the deletions of D183* and G184*.

(c) variants exhibiting at least 90% identity with the wild-type enzyme from Bacillus SP722 (CBU30453, HD066526), especially variants with deletions in the 183 and 184 positions.

Suitable commercially available alpha-amylases are Duramyl®, Liquezyme® Termamyl®, Termamyl Ultra®, Natalase®, Supramyl®, Stainzyme®, Stainzyme Plus®, Fungamyl® and BAN® (Novozymes A/S), Bioamylase® and variants thereof (Biocon India Ltd.), Kemzym® AT 9000 (Biozym Ges. m.b.H, Austria), Rapidase®, Purastar®, Optisize HT Plus®, Enzysize®, Powerase® and Purastar Oxam®, Maxamyl® (Genencor International Inc.) and KAM® (KAO, Japan). Preferred amylases are Natalase®, Stainzyme® and Stainzyme Plus®.

Cellulase:

The composition may comprise a cellulase. Suitable cellulases include those of bacterial or fungal origin. Chemically modified or protein engineered mutants are included. Suitable cellulases include cellulases from the genera Bacillus, Pseudomonas, Humicola, Fusarium, Thielavia, Acre-

*monium*, e.g., the fungal cellulases produced from *Humicola insolens*, *Myceliophthora thermophila* and *Fusarium oxysporum*.

Commercially available cellulases include Celluzyme®, and Carezyme® (Novozymes A/S), Clazinase®, and Puradax HA® (Genencor International Inc.), and KAC-500 (B)® (Kao Corporation).

In one aspect, the cellulase can include microbial-derived endoglucanases exhibiting endo-beta-1,4-glucanase activity (E.C. 3.2.1.4), including a bacterial polypeptide endogenous to a member of the genus *Bacillus* which has a sequence of at least 90%, 94%, 97% and even 99% identity to the amino acid sequence SEQ ID NO:2 in U.S. Pat. No. 7,141,403) and mixtures thereof. Suitable endoglucanases are sold under the tradenames Celluclean® and Whitezyme® (Novozymes A/S, Bagsvaerd, Denmark).

Preferably, the composition comprises a cleaning cellulase belonging to Glycosyl Hydrolase family 45 having a molecular weight of from 17 kDa to 30 kDa, for example the endoglucanases sold under the tradename Biotouch® NCD, DCC and DCL (AB Enzymes, Darmstadt, Germany).

Highly preferred cellulases also exhibit xyloglucanase activity, such as Whitezyme®.

Lipase.

The composition may comprise a lipase. Suitable lipases include those of bacterial or fungal origin. Chemically modified or protein engineered mutants are included. Examples of useful lipases include lipases from *Humicola* (synonym *Thermomyces*), e.g., from *H. lanuginosa* (*T. lanuginosus*), or from *H. insolens*, a *Pseudomonas* lipase, e.g., from *P. alcaligenes* or *P. pseudoalcaligenes, P. cepacia, P. stutzeri, P. fluorescens, Pseudomonas* sp. strain SD 705, *P. wisconsinensis*, a *Bacillus* lipase, e.g., from *B. subtilis, B. stearothermophilus* or *B. pumilus*.

The lipase may be a "first cycle lipase", preferably a variant of the wild-type lipase from *Thermomyces lanuginosus* comprising T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Preferred lipases would include those sold under the tradenames Lipex®, Lipolex® and Lipoclean® by Novozymes, Bagsvaerd, Denmark.

Preferably, the composition comprises a variant of *Thermomyces lanuginosa* (O59952) lipase having >90% identity with the wild type amino acid and comprising substitution(s) at T231 and/or N233, preferably T231R and/or N233R.

In another aspect, the composition comprises a variant of *Thermomyces lanuginosa* (O59952) lipase having >90% identity with the wild type amino acid and comprising substitution(s):

(a) S58A+V60S+I83T+A150G+L227G+T231R+N233R+I255A+P256K;
(b) S58A+V60S+I86V+A150G+L227G+T231R+N233R+I255A+P256K;
(c) S58A+V60S+I86V+T143S+A150G+L227G+T231R+N233R+I255A+P256K;
(d) S58A+V60S+I86V+T143S+A150G+G163K+S216P+L227G+T231R+N233R+I255A+P256K;
(e) E1*+S58A+V60S+I86V+T143S+A150G+L227G+T231R+N233R+I255A+P256K;
(f) S58A+V60S+I86V+K98I+E99K+T143S+A150G+L227G+T231R+N233R+I255A+P256K;
(g) E1N+S58A+V60S+I86V+K98I+E99K+T143S+A150G+L227G+T231R+N233R+I255A+P256K+L259F;
(h) S58A+V60S+I86V+K98I+E99K+D102A+T143S+A150G+L227G+T231R+N233R+I255A+P256K;
(i) N33Q+S58A+V60S+I86V+T143S+A150G+L227G+T231R+N233R+I255A+P256K;
(j) E1*+S58A+V60S+I86V+K98I+E99K+T143S+A150G+L227G+T231R+N233R+I255A+P256K;
(k) E1N+S58A+V60S+I86V+K98I+E99K+T143S+A150G+S216P+L227G+T231R+N233R+I255A+P256K;
(l) D27N+S58A+V60S+I86V+G91N+N94R+D1 U N+T143S+A150G+L227G+T231R+N233R+I255A+P256K;
(m) E1N+S58A+V60S+I86V+K98I+E99K+T143S+A150G+E210A+S216P+L227G+T231R+N233R+I255A+P256K;
(n) A150G+E210V+T231R+N233R+I255A+P256K; and
(o) I202L+E210G+T231R+N233R+I255A+P256K.

Xyloglucanase:

Suitable xyloglucanase enzymes have enzymatic activity towards both xyloglucan and amorphous cellulose substrates, wherein the enzyme is a glycosyl hydrolase (GH) is selected from GH families 5, 12, 44 or 74. Preferably, the glycosyl hydrolase is selected from GH family 44. Suitable glycosyl hydrolases from GH family 44 are the XYG1006 glycosyl hydrolase from *Paenibacillus polyxyma* (ATCC 832) and variants thereof.

Pectate Lyase:

Suitable pectate lyases are either wild-types or variants of *Bacillus*-derived pectate lyases (CAF05441, AAU25568) sold under the tradenames Pectawash®, Pectaway® and X-Pect® (from Novozymes A/S, Bagsvaerd, Denmark).

Mannanase:

Suitable mannanases are sold under the tradenames Mannaway® (from Novozymes A/S, Bagsvaerd, Denmark), and Purabrite® (Genencor International Inc., Palo Alto, Calif.).

Bleaching Enzyme:

Suitable bleach enzymes include oxidoreductases, for example oxidases such as glucose, choline or carbohydrate oxidases, oxygenases, catalases, peroxidases, like halo-, chloro-, bromo-, lignin-, glucose- or manganese-peroxidases, dioxygenases or laccases (phenoloxidases, polyphenoloxidases). Suitable commercial products are sold under the Guardzyme® and Denilite® ranges from Novozymes. Advantageously, additional, preferably organic, particularly preferably aromatic compounds are incorporated with the bleaching enzyme; these compounds interact with the bleaching enzyme to enhance the activity of the oxidoreductase (enhancer) or to facilitate the electron flow (mediator) between the oxidizing enzyme and the stain typically over strongly different redox potentials.

Other suitable bleaching enzymes include perhydrolases, which catalyse the formation of peracids from an ester substrate and peroxygen source. Suitable perhydrolases include variants of the *Mycobacterium smegmatis* perhydrolase, variants of so-called CE-7 perhydrolases, and variants of wild-type subtilisin Carlsberg possessing perhydrolase activity.

Cutinase:

Suitable cutinases are defined by E.C. Class 3.1.1.73, preferably displaying at least 90%, or 95%, or most preferably at least 98% identity with a wild-type derived from one of *Fusarium solani, Pseudomonas Mendocina* or *Humicola Insolens*.

Identity.

The relativity between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.

The water soluble shell may comprise a thermoplastic polymer capable of softening with heat, flowing and hardening upon cooling. Examples of water soluble thermoplastic polymers include polyethers, polyesters, polyvinyl alcohols, polyoxazolines, polyureas, polyurathanes, thermoplastic starches and mixtures thereof.

Suitable polyethers may be selected from the group consisting of polyethylene glycol (PEG), polyethylene oxide, PEG copolymers, and mixtures thereof. Exemplary PEG homopolymers include: polyethylene glycol available from Sigma Aldrich, CARBOWAX™ available from Dow, and Pluriol® available from BASF. Exemplary PEG copolymers include Pluronic® available from BASF, polyetheramines available as Jeffamine® from Huntsman Corporation, poly(lactide-block-ethylene glycol), poly(glycolide-block-ethylene glycol), poly(lactide-co-caprolactone)-block-poly(ethylene glycol), poly(ethylene glycol-co-lactic acid), poly(ethylene glycol-co-glycolic acid), poly(ethylene glycol-co-poly(lactic acid-co-glycolic acid), poly(ethylene glycol-co-propylene glycol), poly(ethylene oxide-block-propylene oxide-block-ethylene oxide), poly(propylene oxide-block-ethylene glycol-block-propylene glycol), and poly(ethylene glycol-co-caprolactone). The polymers may be linear, branched, cross-linked, dendritic, or star polymers. PEG copolymers may be random, block, comb, or graft copolymers.

In one embodiment, the PEG copolymer comprises at least about 50 wt. % PEG.

In one embodiment, at least one voxel of the set of voxels in the actual object resulting from the translation, comprises a polyester derived from the condensation reaction of a polyol, an ionic monomer and optionally one or more chain extenders where the calculated charge density of the resulting polyester is 0.01 to 0.7 mEq/g, and mixtures thereof.

A polyol is a polymer comprising at least one, preferably two or more hydroxyl groups. Examples of polyols include poly(ethylene glycol), poly(ethylene oxide), poly(ethylene glycol) copolymers, and poly(2-oxazoline). Examples of poly(2-oxazoline) polymers include poly(2-ethyl-2oxazoline), poly(2-isopropyl-2-oxazoline), poly(2-propyl-2-oxazoline) and poly[2-ethyl-2-oxazoline-co-2-(4-aminophenyl)-2-oxazoline].

Exemplary polyols include poly(ethylene glycol) available from Sigma Aldrich, CARBOWAX™ available from Dow, and Pluriol® available from BASF. Exemplary polyethylene glycol copolymers include Pluronic® F127, Pluronic® F108, Pluronic® F68 and Pluronic® P105 available from BASF, poly(lactide-block-ethylene glycol), poly(glycolide-block-ethylene glycol), poly(lactide-co-caprolactone)-block-poly(ethylene glycol), poly(ethylene glycol-co-lactic acid), poly(ethylene glycol-co-glycolic acid), poly(ethylene glycol-co-poly(lactic acid-co-glycolic acid), poly(ethylene glycol-co-propylene glycol), poly(ethylene oxide-block-propylene oxide-block-ethylene oxide), poly(propylene oxide-block-ethylene glycol-block-propylene glycol), and poly(ethylene glycol-co-caprolactone).

In one embodiment, the PEG copolymer polyol comprises at least about 50 wt. % PEG and having an average molecular weight of between about 2,000 and about 100,000 AMU. Polyols may be linear, branched, cross-linked, dendritic or star polymers. Polyol copolymers may be random, block, comb or graft copolymers.

Ionic monomers are molecules containing a cationic, anionic or zwitterionic moiety and at least two —COOR groups where R represents independently hydrogen or a C1-C6 aliphatic chain. In one aspect, the charged moiety is selected from the group consisting of —$SO_3^-$, —$SO_4^-$, $PO_4^-$, $PO_3^-$, —$COO^-$ or —$N(CH_3)_3^+$. The counterion may be organic or inorganic.

In another aspect, the ionic monomer has the following structure

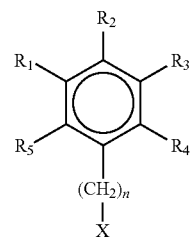

where
$R_1$, $R_2$, $R_3$, $R_4$ and $R_5$ are independently —H, —C1-C6 aliphatic chain, —COOH or —COOCH$_3$
n is an integer from 0 to 6
X is —$SO_3^-$, —$SO_4^-$, $PO_4^-$, $PO_3^-$, —$COO^-$ or —$N(CH_3)_3^+$
Y is a counter ion of opposite charge to X and chosen from $Na^+$, $K^+$, $Li^+$, $Ag^+$, ½ $Ca^{+2}$, ½ $Mg^{+2}$, ½ $Zn^{+2}$, ½ $Mn^{+2}$, ⅓$Al^{+3}$, $F^-$, $Cl^-$ or $Br^-$, $CH_3SO_4$—, or $I^-$.
wherein at least two of $R_1$, $R_2$, $R_3$, $R_4$ and $R_5$ are independently —COOCH$_3$ or —COOH Preferred ionic monomers include salts of dimethyl 5-sulfoisophthalate, sodium dimethyl 5-isophthalate, salts of dimethyl 5-phosphoisophthalate, salts of quantized 4-dimethylamino-benzene-1,2-dicarboxylic acid dimethyl ester, dimethyl aminomalonate, DL-aspartic acid dimethyl ester hydrochloride, salts of sulfo-dimethylfumarate, and dicarboxylic acid analogs to all listed dimethyl esters.

Chain extenders are molecules, oligomers or polymers comprising two or more hydroxyl groups. Chain extenders may be anionic, cationic, zwitterionic or nonionic. Examples of suitable chain extenders include ethylene glycol, diethylene glycol, triethylene glycol, PEG200, salts of PEG200-b-dimethyl 5-sulfoisophthalate-b-PEG200, cyclohexane dimethanol, butane diol, hexane diol, 2,2,4,4-tetramethyl-1,3-cyclobutanediol, cyclobutane diol, 2-Butene-1,4-diol, polycaprolactone diol, 2-Dimethylamino-propane-1,3-diol, trans-2,3-Dibromo-2-butene-1,4-diol, 1,4-Benzenedimethanol, salts of 1,4-bis(2-hydroxyethoxy)-1,4-dioxobutane-2-sulfonate, divalent salts of mono(hydroxyethyl) phthalate, divalent salts of mono(hydroxyehyoxyethyl) phthalate, divalent salts of mono(hydroxybutyl) hexolate, pentaerythritol, trimethylolpropane, and trimethylolethane.

The resulting polymer may be linear, branched or cross-linked. Ion exchange can be used to change the counter-ion of the polymer.

In one embodiment, the water-soluble polymer is polyvinyl alcohol or polyvinyl alcohol copolymer. Examples of polyvinyl alcohol copolymers include butenediol vinylalcohol copolymers available as Nichigo G-polymer™ from Nippon Gohsei and poly(vinyl alcohol)-co-poly(ethylene glycol) available as Kollicoat® from BASF. The polyvinyl alcohols may be partially or fully hydrolyzed.

In one embodiment, the water-soluble polymer is a polyoxazoline. Examples of polyoxazolines include poly(2-oxazoline) and poly(2-ethyl-2-oxazoline) available as Aquazol from Polymer Chemistry Innovations, Inc.

The voxel may further comprise between about 0 and about 65 weight percent (wt. %) of a filler, wherein the filler is a solid at temperatures greater than the melting, processing and printing temperature of the overall composition. Fillers may be organic, inorganic or of mixed inorganic/organic nature. Suitable fillers are selected from the group consisting of: starches, gums, polysaccharides, proteins, amino acids, water soluble polymers, water degradable polymers, water insoluble polymers, sugars, sugar alcohols, inorganic particles, organic salts, surfactants, fatty amphiphiles and mixtures thereof.

Mixtures of fillers may be used. These mixtures can be physical blends of two or more types of fillers or two or more fillers that are melted or dissolved together to form a single filler comprising two or more materials. Suitable methods for forming filler particles include any typical method for creating powders such as grinding, milling, spray drying, roll drying, and prilling.

Every dimension of the filler particles should be smaller than the FDM printer nozzle diameter, more preferably less than 0.5 times and more preferably less than 0.1 times the FDM printer nozzle diameter. The size of filler particles can be reduced by any common method for segregating or reducing particle size including sieving, grinding, cryogenic grinding, and milling. Size and shape of the filler particles can be determined by common means such as sieving through a series of mesh screens or laser diffraction. In one embodiment, the filler particles are spherical or ellipsoidal in shape. Exemplary filler particles are spherical in shape.

The melting temperature of the filler particle must be greater than the melting, processing and printing temperatures of the final mixture. Melting temperature of the filler particles may be determined through standard methods including differential scanning calorimetry or a melt point apparatus.

The composition may further comprise 0 to 35 percent by weight of a plasticizing agent. Some examples of suitable plasticizing agents include water, polyethylene glycol with a molecular weight of 1,000 g/mol or lower, ethylene glycol, propylene glycol, diethylene glycol, and glycerin.

In one embodiment, the water soluble shell encloses a plurality of volumes. The plurality of volumes may be arranged in association with the needs of the product designer and according to the nature of the active element contained within each of the respective volumes. Exemplary arrangements include, stacked volumes, nested volumes, adjacent volumes and combinations thereof.

In one embodiment, both the active agent in the container and the shell contain one or more benefit agents. Selecting different wall thicknesses and changing the concentration of benefit agent on a voxel by voxel basis enables controlled release profile of benefit agents contained in the shell. Benefit agents contained in the enclosed volume allow for a burst release once water compromises the integrity of the container exposing the contents to water. This burst release is not possible with benefit agents located within voxels. The combination of benefit agents in the active agent and the voxels of the container allow for controlled and burst release. Additionally, benefit agents that negatively interact with other ingredients can be segregated either in the active agent or at least on voxel.

In one embodiment, the active element contains less than 40 wt. % water. More preferably, the active element contains less than 10 wt. % water.

In one embodiment, the container, active element and benefit agent are chosen to form a consumer goods product. In one embodiment, the three-dimensional object is a consumer products. Examples of consumer products include, articles, baby care, beauty care, fabric & home care, family care, feminine care, products or devices intended to be used or consumed in the form in which it is sold, and is not intended for subsequent commercial manufacture or modification. Such products include but are not limited to fabric softener, fabric enhancer, laundry additive, conditioners, hair colorants, body wash, shampoo, facial wash, dish detergent, and heavy duty laundry detergent products for and/or methods relating to treating hair (human, dog, and/or cat), including bleaching, coloring, dyeing, conditioning, shampooing, styling; personal cleansing; cosmetics; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; and water purification. In one embodiment, the container is intended to be fully dissolved in water for a single use. In another embodiment, the container slowly erodes allowing for multiple uses.

In one embodiment, a multicompartment container may be filled with particular formulated compositions in each of the multitude of chambers or compartments. Multicompartment containers may contain a plurality of benefit agents. By way of a non-limiting example, a two- or three-component container may contain the formulations presented in Table 1 in separate compartments, where dosage is the amount of the formulation in the respective enclosure. At least one of the compartments contains a liquid composition. Any of the compositions in any of the compartments below may be present in any combination in a pouch, or may even be individually presented, e.g., in a mono-compartment container

TABLE 1

| | G<br>3 compartments | | | H<br>2 compartments | | I<br>3 compartments | | |
|---|---|---|---|---|---|---|---|---|
| | Compartment # | | | | | | | |
| | 1 | 2 | 3 | 1 | 2 | 1 | 2 | 3 |
| | Dosage (g) | | | | | | | |
| | 34.0 | 3.5 | 3.5 | 30.0 | 5.0 | 25.0 | 1.5 | 4.0 |
| Ingredients | Weight % | | | | | | | |
| Alkylbenzene sulfonic acid | 20.0 | 20.0 | 20.0 | 10.0 | 20.0 | 20.0 | | |
| Alkyl sulfate | | | | 2.0 | | | | |

TABLE 1-continued

| | G  3 compartments | | | H  2 compartments | | I  3 compartments | | |
|---|---|---|---|---|---|---|---|---|
| | \multicolumn{8}{c}{Compartment #} | | | | | | | |
| | 1 | 2 | 3 | 1 | 2 | 1 | 2 | 3 |
| | \multicolumn{8}{c}{Dosage (g)} | | | | | | | |
| | 34.0 | 3.5 | 3.5 | 30.0 | 5.0 | 25.0 | 1.5 | 4.0 |
| Ingredients | \multicolumn{8}{c}{Weight %} | | | | | | | |
| C12-14 alkyl 7-ethoxylate | 17.0 | 17.0 | 17.0 | | 17.0 | 17.0 | | |
| Cationic surfactant | | | | 1.0 | | | | |
| Zeolite A | | | | 10.0 | | | | |
| C12-18 Fatty acid | 13.0 | 13.0 | 13.0 | | 18.0 | 18.0 | | |
| Sodium acetate | | | | 4.0 | | | | |
| enzymes | 0-3 | 0-3 | 0-3 | 0-3 | | 0-3 | | |
| Sodium Percarbonate | | | | 11.0 | | | | |
| TAED | | | | 4.0 | | | | |
| Organic catalyst [1] | | | | 1.0 | | | | |
| PAP granule [2] | | | | | | | | 50 |
| Polycarboxylate | | | | 1.0 | | | | |
| Polyethyleneimine ethoxylate [3] | 2.2 | 2.2 | 2.2 | | | | | |
| Hydroxyethane diphosphonic acid | 0.6 | 0.6 | 0.6 | 0.5 | | | | |
| Ethylene diamine tetra(methylene phosphonic) acid | | | | | | 0.4 | | |
| Brightener | 0.2 | 0.2 | 0.2 | 0.3 | | 0.3 | | |
| Mineral oil | | | | | | | | |
| Hueing dye [4] | | | 0.05 | | 0.035 | | 0.12 | |
| Perfume | 1.7 | 1.7 | | 0.6 | | 1.5 | | |
| Water and minors (antioxidant, aesthetics, . . .) | 10.0 | 10.0 | 10.0 | 4.0 | | | | |
| Buffers (sodium carbonate, monoethanolamine) [5] | \multicolumn{8}{l}{To pH 8.0 for liquids  To RA > 5.0 for powders} | | | | | | | |
| Solvents (1,2 propanediol, ethanol) for liquids, sodium sulfate for powders | \multicolumn{8}{l}{To 100%} | | | | | | | |

[1] Sulfuric acid mono-[2-(3,4-dihydro-isoquinolin-2-yl)-1-(2-ethyl-hexyloxymethyl)-ethyl]ester as described in U.S. Pat. No. 7,169,744
[2] PAP = Phtaloyl-Amino-Peroxycaproic acid, as a 70% active wet cake
[3] Polyethylenimine (MW = 600) with 20 ethoxylate groups per —NH.
[4] Ethoxylated thiophene, EO ($R_1 + R_2$) = 5
[5] RA = Reserve Alkalinity (g NaOH/dose)

Example 1—Processes for Synthesizing poly(PEG8k-co-NaSIP)

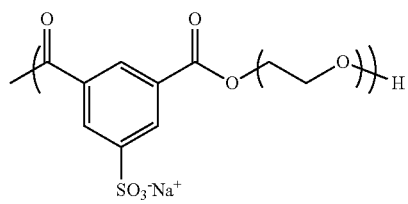

This non-limiting example illustrates the preparation of a poly(PEG8k-co-NaSIP) synthesized via melt transesterification. The melt polymerization of components was prepared by mixing together:

200.01 g of PEG 8,000
7.40 g of dimethyl 5-sulfoisophthalate
219.5 mg of sodium acetate (NaOAc)
103.7 mg of Ti(OiPr)$_4$ (100 mg/mL in n-butanol)

The components are subjected to 3 vacuum purge cycles to remove air. The components are melted together by placing in a silicone oil bath heated to 170° C. under a nitrogen flow. After the components are fully melted, vacuum was applied to 0.2 mbar and allowed to polymerize for 2-4 hours. The reaction mixture is cooled under nitrogen flow.

Example 2—Processes for Synthesizing poly(PEG8k-co-CaSIP) Filament

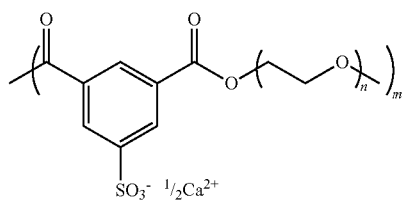

This non-limiting example illustrates the preparation of a poly(PEG8k-co-CaSIP) synthesized via melt transesterification. The melt polymerization of components was prepared by mixing together:

200.01 g of PEG 8,000
7.40 g of dimethyl 5-sulfoisophthalate
219.5 mg of sodium acetate (NaOAc)
103.7 mg of Ti(OiPr)$_4$ (100 mg/mL in n-butanol)

The components are subjected to 3 vacuum purge cycles to remove air. The components are melted together by placing in a silicone oil bath heated to 170° C. under a nitrogen flow. After the components are fully melted, vacuum was applied to 0.2 mbar and allowed to polymerize for 2-4 hours. The reaction mixture is cooled under nitrogen flow. The resulting polymer is poly(PEG8k-co-NaSIP).

Ion-exchanged is used to create poly(PEG8k-co-CaSIP) from poly(PEG8k-co-NaSIP). The dialysis procedure is begun by dissolving 31.51 g poly(PEG8k-co-NaSIP) in 315.1 mL DI $H_2O$. To the polymer solution, 2.3967 g of $CaCl_2$ is added and the polymer solution is placed into cellulose dialysis membranes (molecular weight cutoff=3, 500 g/mol) and placed into 20 L of DI $H_2O$. On days 2 and 3, 2.2659 g and 2.3838 g $CaCl_2$ are added to the polymer solution and the water is replaced. On days 4, 5, and 6, the water is replaced. The resulting ion-exchanged polymer solution is frozen and lyophilized to remove residual water.

Poly(PEG8k-co-CaSIP) filament is created using a desktop scale single screw extruder set to a temperature of 70 C. The polymer is dried using a vacuum oven and cut into to approximately 0.2 mm pellets for the extruder hopper. A conveyor belt is used to pull the filament to a diameter of 1.75 mm from a 2 mm diameter die. Forced convection is used along the conveyor belt and the extruder hopper. Finished filament is stored with desiccant or in a desiccator before use.

Example 3—Single Liquid Detergent Filled Gem Containers

Gems shapes were FDM printed using a direct drive system with an all metal hot end with a 0.4 mm diameter nozzle. For 1.8 mm poly(PEG8k-co-CaSIP) filament, the printing temperature was 70° C. using a glass bed heated to 40° C. For 1.8 mm polyvinyl alcohol filament, sold under the trade name Mowiflex, the printing temperature was 190 to 215 C using a glass bed heated to 50 to 70 C. Surface treatment or adhering a material with sufficient surface roughness to the glass is used to improve first layer adhesion. Forced convection is used to improve part quality of small features. The print was paused before the last few layers were complete and a syringe used to fill the shape with liquid (40 wt. % water) and low-water (10 wt. % water) liquid detergent. After filling, the print was resumed and the shape finished completely sealing the container.

Example 4—Dual Liquid Detergent Filled Container

Shapes were printed FDM printed using a direct drive system with an all metal hot end with a 0.4 mm diameter nozzle. For 1.8 mm poly(PEG8k-co-CaSIP) filament, the printing temperature was 70° C. using a glass bed heated to 40° C. Surface treatment or adhering a material with sufficient surface roughness to the glass is used to improve first layer adhesion. Forced convection is used to improve part quality of small features. The print was paused before the last few layers were complete and a syringe used to fill each cavity with a different liquid detergent formulation. The wall thickness of one cavity was 0.6 mm and the other 0.9 mm. After filling, the print was resumed and the shape finished completely sealing the container.

Example 5—Branded Dual Liquid Filled Container

Shapes according to FIG. X3 were printed FDM printed using a direct drive system with an all metal hot end with a 0.4 mm diameter nozzle. For 1.8 mm poly(PEG8k-co-CaSIP) filament, the printing temperature was 70° C. using a glass bed heated to 40° C. Surface treatment or adhering a material with sufficient surface roughness to the glass is used to improve first layer adhesion. Forced convection is used to improve part quality of small features. The print was paused before the last few layers were complete and a syringe used to fill each cavity with a different liquid detergent formulation. After filling, the print was resumed and the shape finished completely sealing the container.

Example 6—Powder Filled Container

Shapes according to FIG. X4 were printed FDM printed using a direct drive system with an all metal hot end with a 0.4 mm diameter nozzle. For 1.8 mm poly(PEG8k-co-CaSIP) filament, the printing temperature was 70° C. using a glass bed heated to 40° C. Surface treatment or adhering a material with sufficient surface roughness to the glass is used to improve first layer adhesion. Forced convection is used to improve part quality of small features. The print was paused before the last few layers were complete and a powder detergent composition added to cavity. After filling, the print was resumed and the shape finished completely sealing the container.

Example 7—Dual Liquid and Powder Detergent Stacked Container

Shapes according to FIG. X5 were printed FDM printed using a direct drive system with an all metal hot end with a 0.4 mm diameter nozzle. For 1.8 mm poly(PEG8k-co-CaSIP) filament, the printing temperature was 70° C. using a glass bed heated to 40° C. Surface treatment or adhering a material with sufficient surface roughness to the glass is used to improve first layer adhesion. Forced convection is used to improve part quality of small features. The print was paused before the last few layers were complete of the lower void and a powder detergent composition added to cavity. The print was resumed, sealing the first chamber. The print was paused a second time a and the top void filled with a liquid detergent composition. After the second filling, the print was resumed and the shape finished completely sealing the container.

Example 8—Helical Shaped, Dual Liquid Filled Container

Helical shaped containers may be printed FDM printed using a direct drive system with an all metal hot end with a 0.4 mm diameter nozzle. For 1.8 mm polyvinyl alcohol filament, sold under the trade name Mowiflex, the printing temperature was 195 C using a glass bed heated to 60 C. Surface treatment or adhering a material with sufficient surface roughness to the glass is used to improve first layer adhesion. Forced convection is used to improve part quality of small features. The print was paused before the last few layers were complete and a syringe used to fill the cavities with two different liquid detergent compositions in an alternating pattern. After filling, the print was resumed and the shape finished completely sealing the container.

Results

Liquid detergent filled gems according to Example 3 were printed using two materials, poly(PEG8k-co-CaSIP) and polyvinyl alcohol and three wall thicknesses. Each gem was placed in deionized water with mild agitation and observed visually. The water became visually turbid when the container released the detergent composition. The time to release the detergent composition can be controlled by changing both the wall material type and thickness.

TABLE 2

Time to release liquid detergent composition from gem in Example 2 when placed in deionized water when made with varying wall material and thickness.

| Wall Material | Wall Thickness | | |
|---|---|---|---|
| | 0.6 mm | 0.9 mm | 1.2 mm |
| Polyvinyl alcohol | 15 min | 36 min | 60 min |
| Poly(PEG-co-CaSIP) | 7 min | 20 min | 41 min |

Printed containers were stored in the laboratory without temperature or humidity control. The observed stability of these containers is listed in Table 2.

TABLE 3

Stability results for containers stored at ambient laboratory temperatures between 20 and 25 C. Samples are considered unstable when they show visual leaking.

| Shape | Wall thickness | Polymer | Fill | Stability Results |
|---|---|---|---|---|
| Example 3 | 0.6 mm | Poly(PEG8k-co-CaSIP) | Low water detergent | 6+ months |
| Example 3 | 0.6 mm | Poly(PEG8k-co-CaSIP) | Liquid detergent | 1 hour |
| Example 8 | TBD | Polyvinyl alcohol | Low water detergent | 2+ years |

Liquid filled gems of Example 3 were placed for detailed six-month stability testing. Table 3 illustrates the stability results for a variety of temperature and humidity storage conditions.

TABLE 4

Stability results for containers stored at temperatures 5 and 40 C.

| Storage Temp (° C.) | Open/ Closed Container | Capsule Strength after Six Months | % Volatile Fluid loss after six months | Visual Leakage of Fluid from container |
|---|---|---|---|---|
| 5 | Closed | Similar to original gems. No fracture when squeezed by hand | 11 | No |
| 20 | Open | | 14 | No |
| 25 | Closed | | 15 | No |
| 30° C./65% RH | Open | | 14 | No |
| 40 | Closed | | 17 | Slight at tip |

Figure 2:
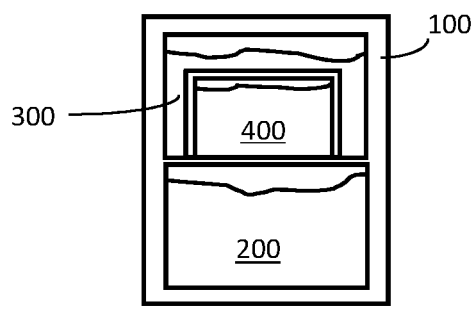
FIG. 2 provides a schematic illustration of a second embodiment of the invention.

FIG. 1 provides a perspective illustration of the exterior of one embodiment of the invention. FIG. 2 provides a cross-sectional view of the interior of the container of FIG. 1. As shown in FIG. 2, the container 1000 comprises shell members 100 which define and separate distinct volumes. The figure illustrates stacked and nested volumes as well as volumes containing filling materials 200, 300, and 400.

Combinations:
- A. A water soluble container comprising a water soluble shell enclosing a volume, the shell at least partially comprising a set of voxels.
- B. The water soluble container according to paragraph A wherein the enclosed volume is at least partially filled with an active element.
- C. The water soluble container according to paragraph B wherein the active element comprises a solid element.
- D. The water soluble container according to any of paragraphs B-C wherein the active element comprises a liquid element.
- E. The water soluble container according to any of paragraphs B-D wherein the active element comprises a gaseous element.
- F. The water soluble container according to any of paragraphs B-E wherein the active agent is selected from the group consisting of: personal cleansing and/or conditioning agents such as hair care agents such as shampoo agents and/or hair colorant agents, hair conditioning agents, skin care agents, sunscreen agents, and skin conditioning agents; laundry care and/or conditioning agents such as fabric care agents, fabric conditioning agents, fabric softening agents, fabric anti-wrinkling agents, fabric care anti-static agents, fabric care stain removal agents, soil release agents, dispersing agents, suds suppressing agents, suds boosting agents, anti-foam agents, and fabric refreshing agents; hard surface care agents, and/or conditioning agents such as liquid and/or powder dishwashing agents (for hand dishwashing and/or automatic dishwashing machine applications), and polishing agents; other cleaning and/or conditioning agents such as anti-microbial agents, perfume, bleaching agents (such as oxygen bleaching agents, hydrogen peroxide, percarbonate bleaching agents, perborate bleaching agents, chlorine bleaching agents), bleach activating agents, chelating agents, builders, lotions, brightening agents, air care agents, carpet care agents, water-softening agents, water-hardening agents, pH adjusting agents, enzymes, flocculating agents, effervescent agents, preservatives, cosmetic agents, make-up removal agents, lathering agents, deposition aid agents, coacervate-forming agents, clays, thickening agents, latexes, silicas, drying agents, odor control agents, antiperspirant agents, cooling agents, warming agents, absorbent gel agents, anti-inflammatory agents, dyes, pigments, acids, and bases; liquid treatment active agents; agricultural active agents; industrial active agents; water-treatment agents such as water clarifying and/or water disinfecting agents, and combinations thereof.
- G. The water soluble container according to any of paragraphs A-F wherein the water soluble shell encloses a plurality of volumes.
- H. The water soluble container according to paragraph G wherein the plurality of volumes comprises a set of nested volumes.
- I. The water soluble container according to any of paragraphs G-H wherein the plurality of volumes comprises a set of stacked volumes.
- J. The water soluble container according to any of paragraphs A-I wherein the water soluble shell comprises a benefit agent.
- K. The water soluble container according to paragraph J wherein the benefit agent is selected from the group consisting of: perfumes, pro-perfumes, finishing aids, malodor control and removal agents, odor neutralizers, polymeric dye transfer inhibiting agents, cationic deposition enhancing polymers, builders, heavy metal ion sequestrants, surfactants, suds stabilizing polymers, pH modifiers, buffering agents, alkalinity sources, fabric softeners, antistatic agents, dye fixatives, dye abrasion inhibitors, wrinkle reduction agents, wrinkle resistance agents, wrinkle release agents, silicones (e.g., silicone oils, cationic silicones, silicone gums, high refractive silicones, and silicone resins), soil release polymers, soil capture polymers, flocculating polymers, soil repellency agents, colorants, pigments, opacifiers, adversive agents such as bittering agents, anti-redeposition agents, bleach activators, bleach catalysts, bleach boosters, bleaches, photobleaches, enzymes, coenzymes, enzyme stabilizers, crystal growth inhibitors, anti-tarnishing agents, anti-oxidants, metal ion salts, corrosion inhibitors, antiperspirant, zinc pyrithione, plant derivatives, plant extracts, plant tissue extracts, plant seed extracts, plant oils, botanicals, botanical extracts, essential oils, skin sensates, astringents, etc. (e.g., clove oil, menthol, camphor, *eucalyptus* oil, eugenol, menthyl lactate, witch hazel distillate), anti-acne agents (salicylic acid), anti-dandruff agents, antifoaming agents, cosmetic astringents, cosmetic biocides, denaturants, drug astringents, external analgesics, film formers or materials, e.g., polymers, for aiding the film-forming properties and substantivity of the composition (e.g., copolymer of eicosene and vinyl pyrrolidone), skin bleaching and lightening agents, (e.g., hydroquinone, kojic acid, ascorbic acid, magnesium ascorbyl phosphate, ascorbyl glucoside, pyridoxine), skin-conditioning agents (e.g., humectants and occlusive agents), skin soothing and/or healing agents and derivatives (e.g., panthenol, and derivatives such as ethyl panthenol, aloe vera, pantothenic acid and its derivatives, allantoin, bisabolol, and dipotassium glycyrrhizinate), skin treating agents (e.g., vitamin D compounds, mono-, di-, and tri-terpenoids, beta-ionol, cedrol), sunscreen agents, insect repellants, oral care actives, personal health care actives, vitamins, antibacterial agents, anti-microbial agents, antifungal agents, their derivatives, and mixtures thereof.

L. The water soluble container according to any of paragraphs A-K wherein at least one voxel comprises a water soluble polymer selected form the group consisting of polyethers, polyesters, polyvinyl alcohols, polyoxazolines, polyureas, polyurathanes, thermoplastic starches and mixtures thereof M. The water soluble container according to paragraph L wherein the water soluble polymer is selected form the group consisting of polyethylene glycol, polyethylene oxide, Pluronics, polyethylene oxide copolymers, polyvinyl alcohol, polyvinyl alcohol copolymers, butenediol vinylalcohol copolymers, poly(2-ethyl-2-oxazoline), polyesters with a charge density of 0.01 to 0.7 mEq/g and combinations thereof.

N. The water soluble container according to any of paragraphs A-M wherein at least one voxel of the shell comprises a plasticizer and/or a filler.

O. The water soluble container according to any of paragraphs A-N wherein the active element comprises between 0 and 40 weight percent water.

P. The water soluble container according to paragraph O wherein the active element comprises between 0.0001 and 20 wt. % water.

Q. The water soluble container according to paragraph P wherein the active element comprises between 0.001 and 10 wt. % water R. The water soluble container according to any of paragraphs A-Q wherein the shell is comprised solely of voxels.

S. The water soluble container according to any of paragraphs B-R where the container is a consumer goods product.

T. A method for creating a water soluble container comprising the steps of:

a. creating a digital representation of the container as a set of voxels;
b. printing a portion of the voxels to create a void space partially surrounded by voxels;
c. filling some or all of the void space with an active element; and
d. printing the remaining voxels to fully enclose the active element.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumer product comprising:
   a. a water-soluble shell comprising a set of voxels; wherein the shell encloses a volume;
   b. a liquid element comprising a benefit agent; wherein the enclosed volume is at least partially filled with the liquid element;
   wherein the shell fully encloses the liquid element.

2. The product of claim 1, wherein the consumer product fully dissolves in water for a single use.

3. The product of claim 1, wherein the product is stable for six months or more.

4. The product of claim 1, wherein there is no visual leakage of fluid from the water-soluble shell after six-months of stability testing.

5. The product of claim 1, wherein the shell is comprised solely of the set of voxels.

6. The product of claim 1, wherein the set of voxels are fabricated using fused deposition material (FDM) techniques.

7. The product of claim 1, wherein the shell comprises a thickness wherein the thickness varies across the volume.

8. The product of claim 1, wherein the shell further comprises a second benefit agent wherein the second benefit agent is releasable when the shell is solubilized.

9. The product of claim 1, wherein the set of voxels comprise a water-soluble polymer selected form the group consisting of polyethers, polyesters, polyvinyl alcohols, polyoxazolines, polyureas, polyurathanes, thermoplastic starches and mixtures thereof.

10. The product of claim 1, wherein the set of voxels comprise water-soluble polymer is selected from the group consisting of polyethylene glycol, polyethylene oxide, polyethylene glycol copolymer, polyethylene oxide copolymers, polyvinyl alcohol, polyvinyl alcohol copolymers, butenediol vinyl alcohol copolymers, poly(2-ethyl-2-oxazoline), and combinations thereof.

11. The product of claim 1, wherein the set of voxels comprise a plasticizer.

12. The product according to claim 1, wherein the liquid element comprises between 0.0001 and 20 wt. % water.

13. The product according to claim 1, wherein the liquid element comprises between 0.001 and 10 wt. % water.

14. The product of claim 1, wherein the consumer product is selected from the group consisting of fabric softener, fabric enhancer, laundry additive, hair conditioner, body wash, hair shampoo, facial wash, dish detergent, laundry detergent, hair styling product, personal cleansing product, cream, lotion, shaving product, hard surfaces cleaner, air care product, product, car care, dishwashing, and combinations thereof.

15. The product of claim 1, wherein the benefit agent is selected from the group consisting of perfumes, pro-perfumes, finishing aids, malodor control and removal agents, odor neutralizers, polymeric dye transfer inhibiting agents, cationic deposition enhancing polymers, builders, heavy metal ion sequestrants, surfactants, suds stabilizing polymers, pH modifiers, buffering agents, alkalinity sources, fabric softeners, antistatic agents, dye fixatives, dye abrasion inhibitors, wrinkle reduction agents, wrinkle resistance agents, wrinkle release agents, silicones soil release polymers, soil capture polymers, flocculating polymers, soil repellency agents, colorants, pigments, opacifiers, adversive agents, anti-redeposition agents, bleach activators, bleach catalysts, bleach boosters, bleaches, photobleaches, enzymes, coenzymes, enzyme stabilizers, crystal growth inhibitors, anti-tarnishing agents, anti-oxidants, metal ion salts, corrosion inhibitors, antiperspirant, zinc pyrithione, plant derivatives, plant extracts, plant tissue extracts, plant seed extracts, plant oils, botanicals, botanical extracts, essential oils, skin sensates, astringents, etc. anti-acne agents, anti-dandruff agents, antifoaming agents, cosmetic astringents, cosmetic biocides, denaturants, drug astringents, external analgesics, film formers, skin bleaching and lightening agents, skin-conditioning agents, skin soothing agents, skin healing agents and derivatives, skin treating agents, sunscreen agents, insect repellants, oral care actives, personal health care actives, vitamins, anti-bacterial agents, anti-microbial agents, antifungal agents, and mixtures thereof.

16. The product of claim 1, wherein the product comprises two or more compartments wherein each compartment comprises a different benefit agent.

17. A consumer product comprising:
   a. a water-soluble shell comprising a set of voxels comprising a water-soluble polymer; wherein the shell encloses a volume;
   b. a liquid element comprising a surfactant; wherein the enclosed volume is at least partially filled with the liquid element;
   wherein the shell fully encloses the liquid element.

18. The product of claim 17, wherein the liquid element further comprises a solvent selected from the group consisting of 1,2 propanediol, ethanol, and combinations thereof.

19. The product of claim 17, wherein the water-soluble polymer comprises polyvinyl alcohol.

20. The product of claim 17, wherein the product is a laundry detergent or shampoo.

* * * * *